(12) United States Patent
Bodigutla

(10) Patent No.: US 12,530,412 B2
(45) Date of Patent: Jan. 20, 2026

(54) SEARCH-QUERY SUGGESTIONS USING REINFORCEMENT LEARNING

(71) Applicant: Microsoft Technology Licensing, LLC, Redmond, WA (US)

(72) Inventor: Praveen Kumar Bodigutla, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1085 days.

(21) Appl. No.: 17/514,297

(22) Filed: Oct. 29, 2021

(65) Prior Publication Data
US 2023/0140702 A1    May 4, 2023

(51) Int. Cl.
G06F 16/9532    (2019.01)
G06F 16/9032    (2019.01)
G06F 18/21      (2023.01)
G06F 18/214     (2023.01)
G06N 3/0455     (2023.01)

(52) U.S. Cl.
CPC ...... *G06F 16/9532* (2019.01); *G06F 16/9032* (2019.01); *G06F 18/214* (2023.01); *G06F 18/2185* (2023.01); *G06N 3/0455* (2023.01)

(58) Field of Classification Search
CPC .............. G06F 16/9532; G06F 18/214; G06F 18/2185; G06F 16/9032; G06N 3/092; G06N 3/0455
See application file for complete search history.

(56) References Cited

U.S. PATENT DOCUMENTS

2019/0278857 A1* 9/2019 Ni ..................... G06F 16/3344
2022/0035868 A1* 2/2022 Holmdahl ............. A63F 13/67

OTHER PUBLICATIONS

Wang, Xiao, et al. "Deep Reinforced Query Reformulation for Information Retrieval." arXiv.Org, 2020. (Year: 2020).*
Srinivasan, Vidhushini, et al. "Natural Language Generation Using Reinforcement Learning with External Rewards." arXiv.Org, 2019. (Year: 2019).*
Lee, Seanie, et al. "Contrastive Learning with Adversarial Perturbations for Conditional Text Generation." arXiv.Org, 2021. (Year: 2021).*

(Continued)

*Primary Examiner* — Matthew Ell
*Assistant Examiner* — Pedro J Morales
(74) *Attorney, Agent, or Firm* — Cantor Colburn LLP; Renee D. Brown

(57) ABSTRACT

Methods, systems, and computer programs are presented for suggesting related search queries. One method includes an operation for obtaining a supervised model by training a machine-learning (ML) program with training data that includes search queries entered by users of an online service. Further, the method includes operations for initializing a generator model with the supervised model, and for improving the generator model using reinforcement learning. The reinforcement learning is being based on a reward based on naturalness, relatedness, and a user having a positive session on the online service. Further, the result of the improvement of the generator model is a roll-out model, which is utilized to generate query suggestions for a user of the online service based on a search query provided by the user.

20 Claims, 8 Drawing Sheets

(56) References Cited

OTHER PUBLICATIONS

Aind, Alwin T., et al. "Q-Bully: A Reinforcement Learning Based Cyberbullying Detection Framework." 2020 International Conference for Emerging Technology (INCET), IEEE, 2020, pp. 1-6. (Year: 2020).*

Yu, Lantao, et al. "SeqGAN: Sequence Generative Adversarial Nets with Policy Gradient." arXiv.Org, 2017. (Year: 2017).*

Jiang, Jyun-Yu, and Wei Wang. "RIN: Reformulation Inference Network for Context-Aware Query Suggestion." Proceedings of the 27th ACM International Conference on Information and Knowledge Management, ACM, 2018, pp. 197-206. (Year: 2018).*

Wu, Bin, et al. "Query Suggestion with Feedback Memory Network." Proceedings of the 2018 World Wide Web Conference, International World Wide Web Conferences Steering Committee, 2018, pp. 1563-1571. (Year: 2018).*

Liu, Ye, et al. "Generative Question Refinement with Deep Reinforcement Learning in Retrieval-Based QA System." Proceedings of the 28th ACM International Conference on Information and Knowledge Management, ACM, 2019, pp. 1643-1652. (Year: 2019).*

Luo J, Dong X, Yang H. Learning to reinforce search effectiveness. InProceedings of the 2015 International Conference on The Theory of Information Retrieval Sep. 27, 2015 (pp. 271-280). (Year: 2015).*

Zhiyong Lu, W. John Wilbur, Improving accuracy for identifying related PubMed queries by an integrated approach, Journal of Biomedical Informatics, vol. 42, Issue 5, 2009, pp. 831-838, https://doi.org/10.1016/j.jbi.2008.12.006. (Year: 2009).*

* cited by examiner

SEARCH-QUERY SUGGESTIONS USING REINFORCEMENT LEARNING

TECHNICAL FIELD

The subject matter disclosed herein generally relates to methods, systems, and machine-readable storage media for assisting users during searches.

BACKGROUND

Online services with large amounts of data want to help users to search the data, so the users can quickly find what they are looking for and have a positive experience within the online service. One of these help mechanisms includes providing search-query suggestions.

However, oftentimes the query suggestions are not helpful, when the query suggestions include repetitive, unnatural, or irrelevant suggestions, and even suggestions that may be considered sensitive or offensive.

There is a need for helping the user during searches by providing high-quality suggestions that will allow the user to find the desired data quickly.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
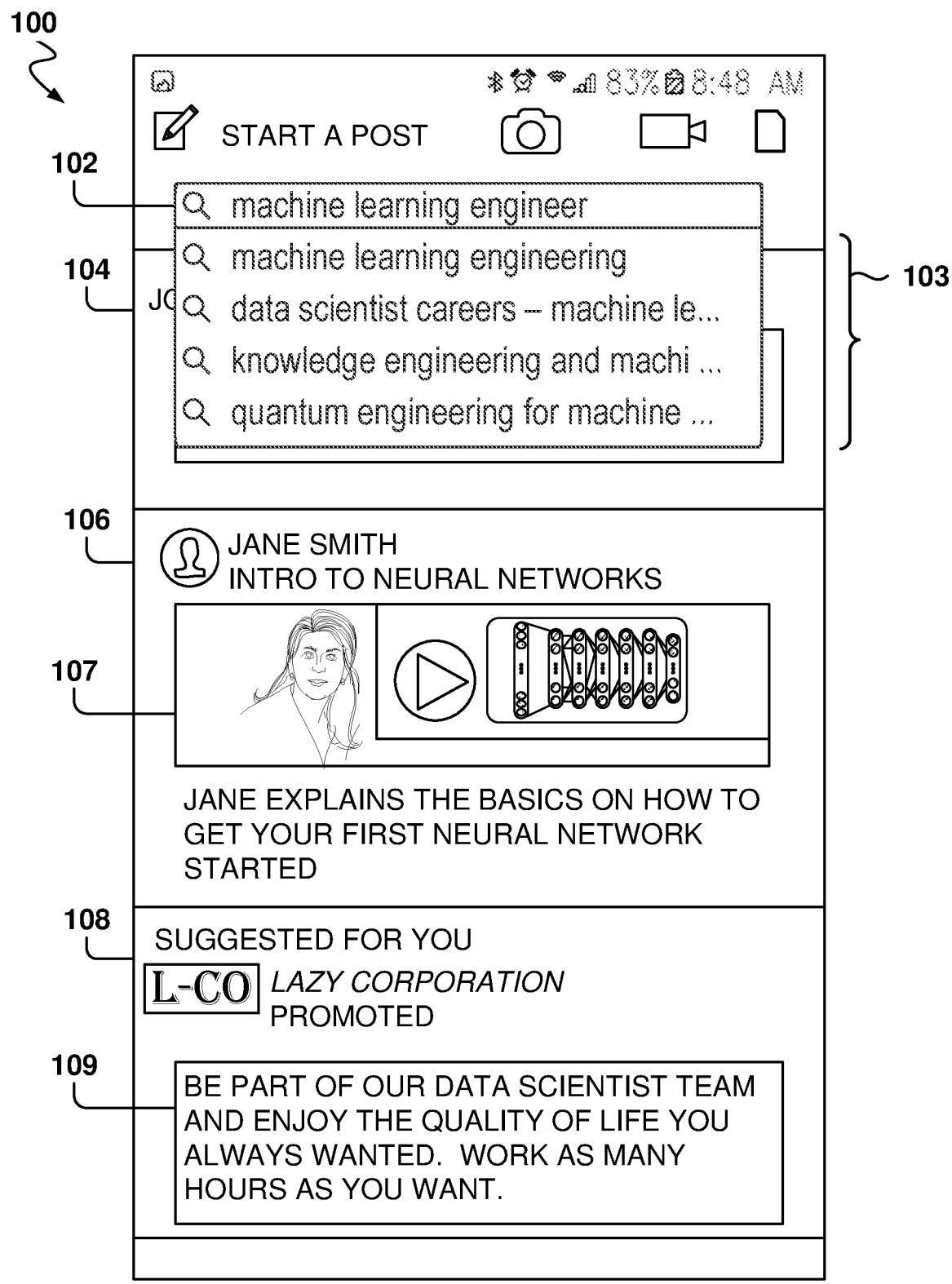
FIG. 1 is a user interface of a user feed with interactive query suggestions, according to some example embodiments.

Example methods, systems, and computer programs are directed to suggesting related search queries, where related refers to search queries that are associated with a search query invoked by the user. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, quality related search-query suggestions are provided to recommend search queries that are real, relevant, heterogenous, unoffensive, unbiased, and engaging. Reinforcement Learning (RL) is used to reformulate a query using terms from search results. To recommend quality search queries, a deep reinforcement learning model is created to predict the query a user would enter next. The reward signal is composed of long-term session-based user feedback, syntactic relatedness, and estimated naturalness of the generated query.

Contextual semi-supervised models are leveraged to initialize the RL-based generation models. Using user-feedback, large-scale automatic naturalness estimator and similarity measures, between source and target sentences, adaptive RL models are trained to fine-tune and improve the quality of text generated by the supervised models. This approach achieves multiple objectives simultaneously, including increase in user engagement, improved heterogeneity and relatedness of results, reduction in erroneous suggestions unrelated to the user query, reduction in results with offensive content, and improvement in business metrics (e.g., relevance metrics).

One general aspect includes obtaining a supervised model by training a machine-learning (ML) program with training data that includes search queries entered by users of an online service. Further, a generator model is generated for generating query suggestions based on the supervised model. The generator model is improved through multiple iterations based on a reward calculation to optimize a reward obtained by results produced by the generator model. The reward includes multiple terms to optimize different factors. In one aspect, the reward is designed to generate queries that are natural sounding (as if generated by a user instead of a machine), are related to the user original query, and improve user feedback that measures the engagement of the user within the connections network. After the last iteration, the optimized generator model is a roll-out model that generates query suggestions for a user of the online service based on a search query provided by the user.

Another general aspect includes a method that includes an operation for obtaining a supervised model by training a machine-learning (ML) program with training data that includes search queries entered by users of an online service. Further, the method includes operations for initializing a generator model with the supervised model, and for improving the generator model using reinforcement learning. The reinforcement learning is being based on a reward based on naturalness, relatedness, and a user having a positive session on the online service. Further, the result of the improvement of the generator model is a roll-out model, which is utilized to generate query suggestions for a user of the online service based on a search query provided by the user.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, e.g., a professional network, an interest-based network, or any online networking system that permits users to join as registered members. For the purposes of this description, registered members of a connections network may be referred to as simply members. Further, some connections networks provide services to their members (e.g., search for jobs, search for candidates for jobs, job postings) without being a social network, and the principles presented herein may also be applied to these connections networks.

FIG. 1 is a screenshot of a user feed 100 that includes items in different categories, according to some example embodiments. In the example embodiment of FIG. 1, the user feed 100 includes a query field 102 for entering search queries. The online service provides a list of related queries 103 (also referred to as query suggestions) derived from the query entered, or selected from a previous list of suggestions, by the user. In the illustrated example, the user has entered a search for "machine learning engineer," and the online service has suggested other searches, such as "machine learning engineering," "data scientist careers-machine learning," "knowledge engineering and machine learning," and "quantum engineering for machine learning."

The query suggestions are important to improve the usability of search engines. The list of query suggestions is composed with multiple objectives in mind, such as improving relevance of the results and improving user engagement with the online service (e.g., remaining engaged with the online service for a longer time). Embodiments presented herein provide search-query recommendations that are natural (e.g., as would be entered by a real user), heterogenous, relevant, error-free, and engaging.

The user feed 100 also includes different information categories, such as job recommendations 104 (covered by the query suggestions), user posts 106, and sponsored items 108. Other embodiments may include additional categories 109 such as news, messages, articles, etc.

The user posts 106 include item 107 posted by users of the connections network (e.g., items posted by connections of the user), and may be videos, comments made on the connections network, pointers to interesting articles or webpages, etc. In the illustrated example, the item 107 includes a video submitted by a user.

Although the categories are shown as separated within the user feed 100, the items from the different categories may be intermixed, and not just presented as a block. Thus, the user feed 100 may include a large number of items from each of the categories, and the online service decides the order in which these items are presented to the user based on the desired utilities. Additionally, the user may receive in-network communications from other users. The communications may originate by other users who are socially connected with the user or by unconnected users.

Some existing recommendation systems may generate suggestions that may be offensive or unnatural (e.g., "machine learning learning"), where unnatural refers to suggestions that would not be created by a person. Thus, a goal is to avoid presenting offensive or unnatural suggestions.

Figure 2:
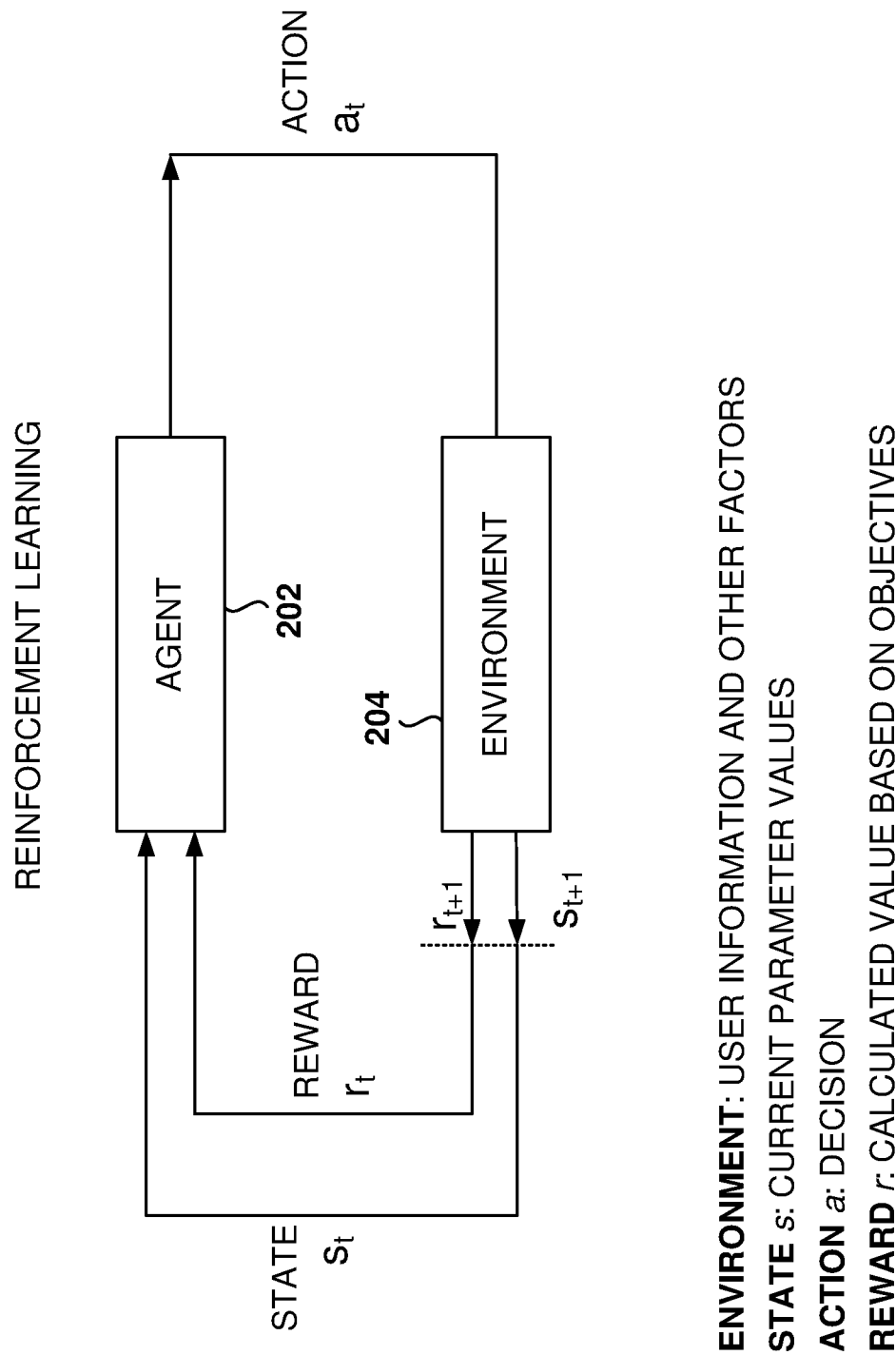
FIG. 2 illustrates the process of making assessments with reinforcement learning, according to some example embodiments.

FIG. 2 illustrates the process of making assessments with reinforcement learning, according to some example embodiments. Reinforcement learning (RL) is an area of machine learning concerned with how software agents ought to take actions in an environment to maximize a value of a parameter, which is referred to as a reward. In some cases, the cumulative value of the parameter is the addition of the values of the parameter (e.g., the reward) over time, such as the value of the parameter at different states. RL is one of three basic machine learning paradigms, alongside supervised learning and unsupervised learning. RL differs from supervised learning in that labelled input-output pairs need not be presented, and sub-optimal actions need not be explicitly corrected.

The environment 204 is sometimes formulated as a Markov decision process (MDP), as many reinforcement learning algorithms for this context utilize dynamic programming techniques. RL includes sequential states, where each state has an action (e.g., decision), and the sequential decision making is for maximizing a total reward over a given horizon, while the system evolution is impacted by the actions taken at each state.

Reinforcement learning systems learn what to do given the situation so as to maximize some numerical value which represents a long-term objective. In a typical setting, an agent 202 receives the state $s_t$ of the environment 204 and a reward $r_t$ associated with the last action $a_{t-1}$ and state transition. RL then chooses an action $a_t$ based on RL's policy. In response, the system makes a transition to a new state $s_{t-1}$ and the cycle is repeated. The problem is to learn an RL policy for the agent 202 (e.g., the connections network) to maximize the total reward for all states. Differently from supervised learning, with RL, partial feedback is given to the learner about the learner's predictions.

In a standard reinforcement learning setting, an agent interacts with the environment over a number of discrete time steps. At every time step t, the agent receives a state $s_t$ and chooses an action $a_t$ according to a policy, which is a deterministic or stochastic mapping from states $s_t$ to actions at. In return, the agent receives the next state $s_{t+1}$ and a scalar reward $r_t$. In some embodiments, this long-term reward is defined as $R_t = \Sigma_{k=0}^{\infty} \gamma^k r_{t+k}$, where $\gamma \in (0,1]$ is a discount factor. This discount factor controls the tradeoff between the short-term optimization and long-term optimization. The goal of the agent is to maximize the expected $R_t$.

In some example embodiments, the environment 204 includes information about the user (e.g., profile information, activity history, contact information), queries entered by users, user activity on the online service, etc.

The action a is the decision to be made, such as recommendations presented for search queries. Further, the reward r denotes the immediate reward. Since the decision is evaluated periodically, the reward is based on how much value a user gets during the period between decisions.

With reference to query recommendations, RL evaluates several objectives, as described in more detail below with reference to FIG. 4, such as naturalness, relatedness, and user feedback, but other embodiments may use other or different objectives for calculating the reward. Naturalness refers to generating query suggestions that are natural, that is, query suggestions that would be entered by a person instead of strange query suggestions that would not be entered by a person (e.g., machine learning learning). Relatedness refers to the degree by which the query suggestion is related to the current search query entered by the user. Further, user feedback measures the engagement of the user within the online service, such as selecting suggested queries and amount of time the user is engaged with the online service in a session.

Existing techniques for query suggestions include Sequence-to-Sequence (Seq2Seq) encoder-decoder architectures, supervised autoregressive generative models trained with ground-truth labels suffer from exposure bias, and Maximum Likelihood Estimation (MLE). However, these machine learning (ML) approaches that are trained on immediate user feedback (e.g., click on recommended query) are prone to selection-bias, related to getting feedback on the results that are returned. Further, "Local" Deep-Reinforcement-Learning (DRL) frameworks for query reformulation adjust a query relative to the initial search results. However, processing search results to reformulate the query and mining entire collection of documents is not practical in large-scale real-world applications, due to rapidly changing and ever-growing user-generated content.

DRL text generation approaches, such as policy-gradient based Sequential Generative Adversarial Networks (Seq-GAN) achieved good performance on generating creative text sequences.

In the presented techniques, the high-quality query suggestions problem is solved by modeling the query generator as a stochastic parametrized policy. The Seq2Seq Neural Machine Translation (NMT) model is fine-tuned for query generation using a policy-gradient REINFORCE algorithm 306, as described below.

Figure 3:
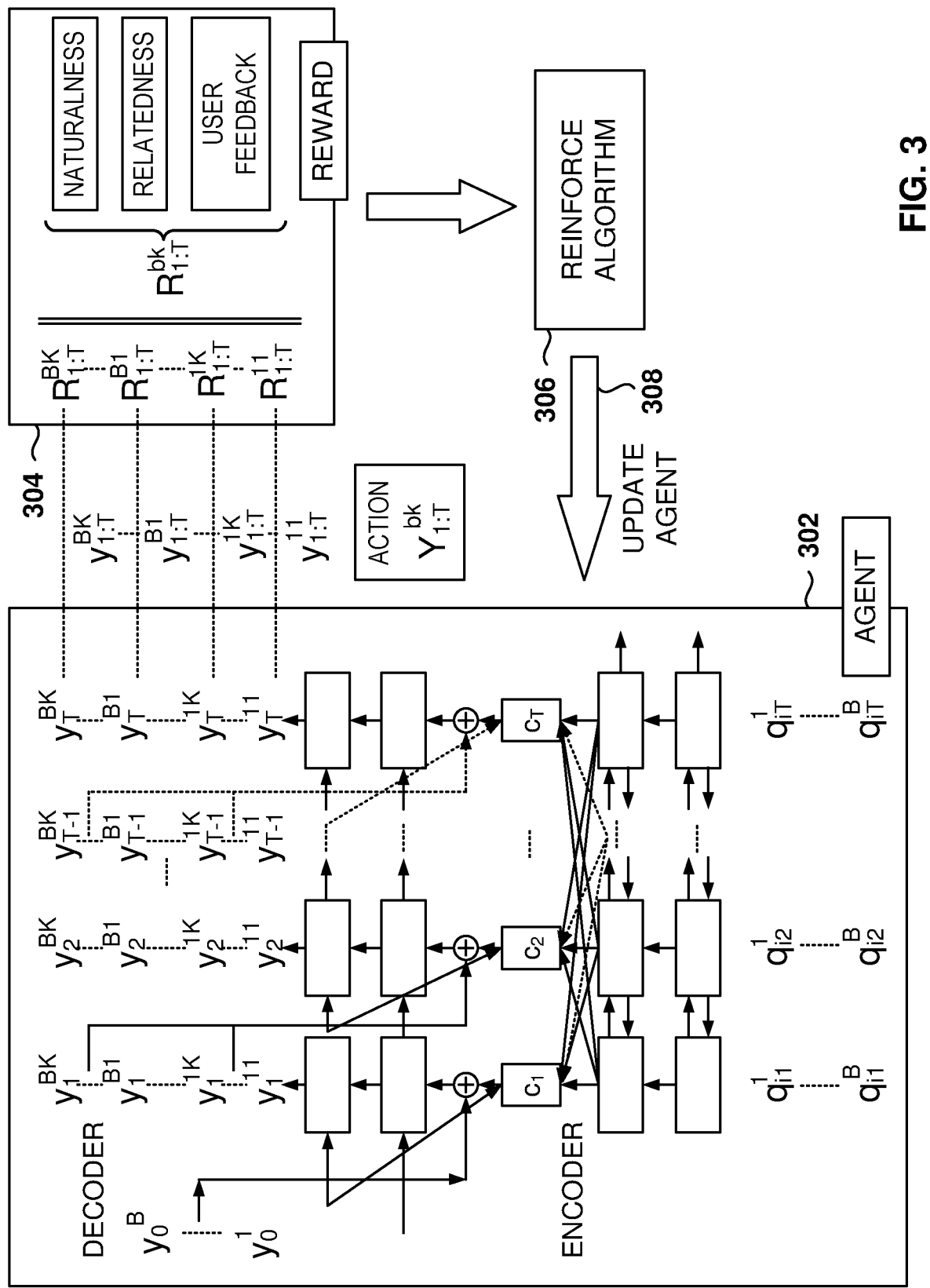
FIG. 3 illustrates the use of deep reinforcement learning for text query generation, according to some example embodiments.

FIG. 3 illustrates the use of deep reinforcement learning for text query generation, according to some example embodiments. In some example embodiments, DRL for text-generation is performed with the REINFORCE algorithm 306. The REINFORCE algorithm 306 was introduced by Ronald J. Williams in 1992, and the REINFORCE algorithm 306 makes weight adjustments in a direction that lies along the gradient of expected reinforcement in both immediate-reinforcement tasks and certain limited forms of delayed-reinforcement tasks, without explicitly computing gradient estimates or even storing information from which such estimates could be computed. In other embodiments, other types of reinforcement algorithms may be utilized based on the reward 304.

In some example embodiments, the agent 302 is an encoder-decoder Seq2Seq attention model, which is a supervised model. At a summary level, the input query is $q_{i(1:T)}^{bk}$ for batch-index b∈B and Monte-Carlo sample index k∈K. The input queries are used by the supervised model to predict the output queries at the top generated by the decoder. At a high level, the supervised model is generated, and the model is improved iteratively using reinforcement learning.

The generated words ($y_t^{1:B,1:K}$) concatenated with attention context ($c_{t+1}$) are passed as input to the decoder's (t+1) time step. For each generated sequence ($y_{1:T}^{bk}$), the policy update is done using the RL reward ($R_{1:T}^{bk}$), which is calculated at the end of each generated sequence. More details on these parameters are provided below.

In some example embodiments, the DRL reward 304, also referred to as future reward, is composed of three signals: unnatural query generation penalty, syntactic similarity between generated query and user's most recent search query, and long-term implicit user-feedback within a search-session. Other embodiments may use fewer or additional signals, e.g., a signal to control offensive, discriminatory, or obscene suggestions.

Leveraging implicit user-feedback from search-sessions, as opposed to using immediate feedback, helps in maximizing user engagement across search-sessions, addresses the reward-sparsity problem, and removes the need to obtain expensive human annotations. A weakly supervised context-aware-naturalness estimator model estimates the naturalness probability of a generated query. Monte Carlo simulations are performed to propagate rewards. However, the computation cost is reduced substantially by performing policy roll-out from the first time-step of the decoder in the agent 302.

A DRL policy-gradient technique is used for making high-quality related-query suggestions at scale. Embodiments achieve improvement in-terms of recommendation heterogeneity, down-stream user-engagement, relevance, and errors per sentence. This approach combines long-term session-based user-feedback, un-natural sentence penalty, and syntactic relatedness reward signals, which are jointly optimized to improve the quality of query suggestions.

A weakly supervised Seq2Seq Neural Machine Translation (NMT) model (Seq2SeqNMT) is fine-tuned to initialize the query generation policy. The process then includes two operations: 1) learn a context-aware weakly supervised naturalness estimator; and 2) fine-tune the pre-trained supervised Seq2SeqNMT model using reinforcement learning. The future-reward is composed of user-feedback in a search session (U+), syntactic similarity (ROUGE calculation), and unnaturalness penalty ($-\eta*(1-D_\phi)$) of the generated query given the co-occurring previous query.

Regarding the weakly supervised pre-training of the model, variants of mono-lingual supervised Seq2SeqNMT models are used. The supervised Seq2SeqNMT model is trained using co-occurring consecutive query pairs in search sessions. A search session is a stream of queries entered by a user in a predetermined time window (e.g., five minutes but other times windows may be used).

Further, N−1 consecutive query pairs ($q_i$, $q_{i+1}$) are extracted from a search session consisting of a sequence of N queries ($q_i$, $q_2$, . . . , $q_N$). Consecutive queries could be unrelated, semantically, or syntactically related. The model is weakly supervised because query pairs are used and are not filtered using sparse click data, costly human-evaluations, and weak association rules. Weak supervision allows the training process to scale and minimize selection-bias, while improving model generalization. For example, syntactic similarity heuristics are not applied to filter query pairs as queries could be semantically related yet syntactically dissimilar (e.g., "artificial intelligence" and "machine learning").

In some example embodiments, the Seq2SeqNMT encoder-decoder framework, in the agent 302, consists of a BiLSTM encoder that encodes a batch of size B of input queries ($q_i^{1:B}$) and the LSTM decoder generates a batched sequence of words y=($y_1^{1:B}$, . . . , $y_T^{1:B}$), where T is the sequence length (e.g., maximum length of the query). During training, teacher forcing is used, e.g., making the co-occuring query ($q_{i+1}^{1:B}$) as input to the decoder. The context attention vector is obtained from the alignment model. Further, categorical cross entropy loss is minimized during training and hyper-parameters of the model are fine-tuned.

The reward estimation and DRL model training steps, to fine-tune and improve the policy obtained via pre-trained supervised model, are described next. Regarding the DRL model, the parameters of the DRL agent Gθ are initialized with the pre-trained Seq2SeqNMT model. The initial policy is fine-tuned using the REINFORCE policy-gradient algorithm, but other algorithms may be used. Further, K complete sentences ($y_{1:T}^{b,1:K}$) generated per query ($q_i^b$) constitute the action space at time-step T, where b∈B is the index in a mini-batch of B queries.

To mitigate exposure-bias, generated words ($y_{t-1}^{1:B,1:K}$), from a previous time-step, are passed as input to the next time-step 't' of the decoder. The future reward ($R_{D_\phi}(y_{1:T}^{bk})$) 304, computed at the end of each generated sample, is back-propagated to the encoder-decoder model. Further, given the start state ($s_0^{b1}$) comprising the input query ($q_i^b$) and the <START> token $y_0^b$, the objective of the agent is to generate related-search query suggestions ($y_{1:T}^b$) which maximize the following objective:

$$J(\theta)=B[R_{D_\phi}(y_{1:T}^b|S_0^b,\theta)] \quad (1)$$

The per-sample reward is calculated with the following equation:

$$R_{D_\phi}(y_{1:T}^{bk}) = U_+ + (1 - U_+) * \left( ROUGE_{q_i^b, y_{1:T}^{bk}} - \eta * (1 - D_\phi(y_{1:T}^{bk})) \right) \quad (2)$$

Monte Carlo simulations are used to model the probability of different outcomes in a process that cannot easily be predicted due to the intervention of random variables. A Monte Carlo simulation performs analysis by building models of possible results by substituting a range of values—a probability distribution—for any factor that has inherent uncertainty. The simulation then calculates results many times, each time using a different set of random values from the probability functions. Depending upon the number of uncertainties and the ranges specified for them, a Monte Carlo simulation could involve thousands or tens of thousands of recalculations before it is complete. The Monte Carlo simulation produces distributions of possible outcome values. The Monte Carlo simulation often follows the following operations: 1) define a domain of possible inputs; 2) generate inputs randomly from a probability distribution over the domain; 3) perform a deterministic computation on the inputs; and 4) aggregate the results.

At a high level, the expectation is calculated is using a Monte Carlo (MC) simulation. The input queries are presented as a batch and are passed through the model to obtain the output queries, which are sampled K times, and the reward 304 is calculated for each sampled query. The parameter K is configurable. Then, the average reward (e.g., expected reward) for the queries is calculated, which is back propagated 308 to update the weights in the deep learning model.

The supervised model provides suggestions to maximize the likelihood of seeing a particular sentence after an input sentence is entered. Whereas reinforcement learning model takes that as input and then refines it so that it generates queries, which are more rewarding. And not just something that a user would enter next.

The calculated rewards are used to calculate the expectation of the reward. The MC approximation of the gradient using likelihood ratio trick is described by the following equation:

$$\Delta_\theta J(\theta) \approx \frac{1}{K} * \sum_{k \in K} \left[ R_{D_\phi}(y_{1:T}^{bk}) * \Delta_\theta \log G_\theta(y_{1:T}^{bk} | S_0^b) \right], y_{1:T}^{bk} \in MC^{G_\beta}(y_{1:T}^{bk}) \quad (3)$$

The factor 1/K is because there are K samples. Unlike SeqGAN approach for DRL model training where the action-value at each intermediate time-step t is evaluated by generating K samples $(y_{t+1:T}^{b,1:K})$ embodiments perform MC policy roll-out from the start state alone. Further, K queries $(y_{1:T}^{b,1:K})$ are generated using a roll-out policy $G_\beta$, for each input query $q_i^b$. This modification reduces the computation cost by a factor of O(T) per input query, that is $O(KT^2) \rightarrow O(KT)$. Embodiments generate full sequences from the start state, which is why the method has a complexity of KT instead of $KT^2$, which reduces the computation cost.

A roll-out policy generator $G_\beta$ is initialized with the initial generator policy $G_\theta$ and both generators are periodically updated during training using a configurable schedule, as described below with reference to FIG. 4. At each time-step t, the state $S_t^{bk}$ comprises the input query and the tokens produced so far $(\{q_i^b, y_{1:t-1}^{bk}\})$, and the action is the next token $y_t^{bk}$ to be selected from stochastic policy $G_\theta(y_t^{bk}|S_t^{bk})$. Details of the constituents of future-reward $$\left( U_+, ROUGE_{q_i^b, y_{1:T}^{bk}} \right) \text{ and } D_\phi(y_{1:T}^{bk})$$

are described below.

The expectation E[X] can be approximated using sampling methods, and the generator's parameters are updated with a as the learning-rate as follows:

$$\theta \leftarrow \theta + \alpha * \Delta_\theta J(\theta) \quad (4)$$

In some example embodiments, the three components of the future-reward $R_{D_\phi}(y_{1:T}^{bk})$ include the session based positive user-feedback U+, the syntactic-similarity $$\left( ROUGE_{q_i^b, y_{1:T}^{bk}} \right),$$

and the unnatural suggestion penalty $$(-\eta * (1 - D_\phi(y_{1:T}^{bk}))).$$

A positive user feedback U+ in a search session may include viewing search-results (e.g., dwell time of five seconds or more), and performing an engaging action (e.g., sending a connection request or a message, applying for a job, favoriting a group, a profile or an article), which are examples of positive implicit user actions in the search-session. In general, immediate user-feedback is sparse; however, positive user action percentage increases (e.g., 10% in an experiment) for the remainder of the search session after the user entered query $q_{i+1}$ is considered.

In some embodiments, session-based user-feedback is maximized to assist in the goal of maximizing user engagement across search sessions. For a generated query $y_{1:T}^{bk}$, the session-based user feedback U+ is "1" (or some other value considered as positive), if a positive down-stream user action is observed in the remainder of the search-session, and "0" if no positive down-stream user action is observed. Thus, if U+ is 1, equation (2) will return a value of 1. If U+ is 0, equation (2) will return the value associated with the ROUGE calculation.

Recall-Oriented Understudy for Gisting Evaluation (ROUGE) is a set of metrics and a software package used for evaluating automatic summarization and machine translation software in natural language processing. The metrics compare an automatically produced summary or translation against a reference or a set of references (human-produced) summary or translation.

With reference to the relatedness $$\left( ROUGE_{q_i^b, y_{1:T}^{bk}} \right),$$

despite the increasing the percentage of associated positive user action by considering user's feedback across a search session, the label-sparsity problem is not completely mitigated. In the search query logs, when there is no positive downstream user action associated with a generated query $y_{1:T}^{bk}$, the reward is estimated using a syntactic-similarity measure. Thus, reformulated queries are syntactically and semantically similar. In some example embodiments, the syntactic relatedness of the generated query $y_{1:T}^{bk}$ is computed with the source query $q_i^b$ using the ROUGE score. As discussed above, b is for a particular batch and 1:T refers to the entire generated query sequence.

With reference to the naturalness probability of generated query $D_\phi(y_{1:T}^{bk})$, users enter either natural language search queries (e.g., "jobs requiring databases expertise in the bay area") or users enter keywords (e.g., "bay area jobs database"). In the context of related query suggestions, a "natural" query is defined as a query which a real user is likely to enter. A contextual-naturalness estimation model is trained to predict the naturalness probability $D_\phi(y_{1:T}^{bk})$ of a generated query given the previous query entered by the user as context. That is, $D_\phi$ is the probability that the query looks natural.

For example, "AI jobs" is an example of a natural query after the user searched for "Google", even though both queries are syntactically and semantically (jobs vs company) dissimilar. However, the query "AI AI jobs jobs" is unnatural and is unlikely to be entered by a real user due to the unexpected duplication of words. In the DRL reward formulation, a penalty term $-\eta*(1-D_\phi(y_{1:T}^{bk}))$ is added to the syntactic-relatedness $$\left( ROUGE_{q_i^b, y_{1:T}^{bk}} \right)$$

score to discourage generation of unnatural queries. The coefficient $\eta$ is a configurable penalty weight.

With reference to the contextual naturalness estimator, in some embodiments, a BiLSTM supervised model is utilized, which predicts the probability a generated query is "natural" ($D_\phi(y_{1:T}^{bk})$). Concatenated with the query-context the user entered queries $q_{i+1}$ serve as positive examples ($q_i \oplus q_{i+1}$) to train the model. In some example embodiments, four methods are used to generate negative examples) per each positive example, ($q_i \oplus q_i^{neg}$ namely: 1) With $q_i$ as input, sample query $q_i^{neg}$ from the fine-tuned Seq2SeqNMT model's decoder; 2) perturb $q_{i+1}$ by duplicating a word in a randomly-selected position within the sentence; 3) replace a word with an unknown word token ("<UNK>") at a randomly selected position in $q_{i+1}$; and 4) generate a sentence by repeating a sampled word from a categorical distribution ($p_{w_1} \ldots p_{w_{|V|}}$) for (randomly chosen) $r \in [1, T-1]$ times. Further, $|V|$ is the size of the training data vocabulary, $p_{w_i} = n_{w_i}/N_{|V|}$, where $n_{w_i}$ is word ($w_i$) frequency and $N_{|V|} = \Sigma_{w_i \in |V|} n_{w_i}$. Methods 1, 2, and 3 generate hard-negative examples and method 4 captures popularity bias, a situation where popular terms are generated more often than terms in the long-tail (e.g., less frequent). Other embodiments may use additional or fewer negative examples.

To validate the hypothesis that sampled queries from Seq2SeqNMT are less natural than the ones provided by the user, three annotators rated 100 randomly sampled query pairs ($q_1$, $q_2$). Query $q_1$ is entered by the user and $q_2$ is either sampled from a supervised model or entered by the user after searching for $q_1$.

Without revealing the source of $q_2$, annotators were asked to identify if the query was "natural". In some experiments, an average 58% of model-generated queries and 74% of real-user queries were identified as natural. The Inter Annotator Agreement (IAA) was poor (0.04) when the users evaluated model-generated sentences. In comparison, when they evaluated queries entered by real users, IAA was better (0.34) between the three annotators' ratings. Higher IAA and higher percentage of queries identified as "natural" imply that real-user queries are more natural and distinguishable than queries sampled from the pre-trained Seq2SeqNMT model.

Figure 4:
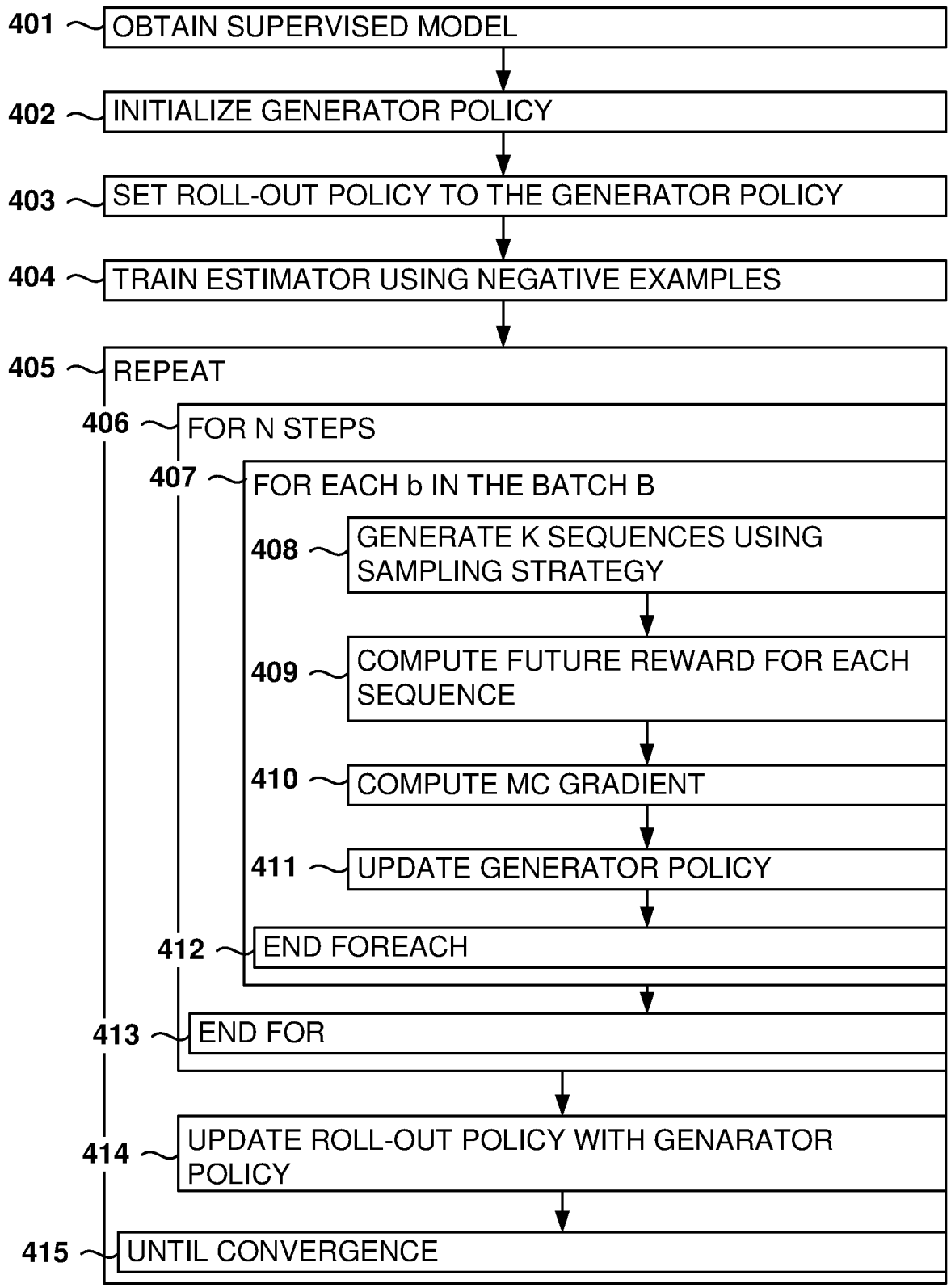
FIG. 4 details the process for deep reinforcement learning for text query generation, according to some example environments.

FIG. 4 details the process for deep reinforcement learning for text query generation, according to some example environments. The method for generating queries can be described as follows:

| | |
|---|---|
| 401. | Fine-tune supervised model using MLE with $q_{i\{1:T\}}^{1:B}$ as input sequence and $q_{\{i+1\}\{1:T\}}^{1:B}$ as target sequence. |
| 402. | Initialize generator policy $G_\theta$ with fine-tuned supervised model. |
| 403. | $\beta \leftarrow \theta$ |
| 404. | Train contextual-naturalness-estimator $D_\phi$ using negative examples generated from $G_\theta$. |
| 405. | repeat |
| 406. |   for n steps |
| 407. |     for each b ∈ B |
| 408. |       Generate "K" sequences $y_{1:T}^{b,1:K}$ using configured sampling-strategy $y_{1:T}^{b,1:K} = y_1^{b,1:K}, y_2^{b,1:K}, \ldots, y_T^{b,1:K}) \sim G_\beta$ |
| 409. |       Compute future-reward at the end of each generated sequence using equation (2) |
| 410. |       Compute MC gradient $\Delta J(\theta)$ (equation (3)) |
| 411. |       Update $G_\theta$ parameters via policy-gradient (equation (4)) |
| 412. |     end foreach |
| 413. |   end for |
| 414. |   $\beta \leftarrow \theta$ |
| 415. | until convergence. |

The generator policy is $G_\theta$ and the roll-out policy is $G_\beta$. Further the naturalness-estimator is $D_\phi$. The query-pair in a search session is ($q_{i\{1:T\}}^{1:B}$, $q_{\{i+1\}\{1:T\}}^{1:B}$), the batch size is B, and the MC sampling-strategy $\epsilon$[beam-search, sampling from categorical distribution].

At operation 401, the supervised model is trained using MLE with $q_{i\{1:T\}}^{1:B}$ as input sequence and $q_{\{i+1\}\{1:T\}}^{1:B}$ as the target sequence.

At operation 402, the DRL (encoder-decoder) agent Go is initialized with the pretrained Seq2Seq$_{NMT}$ policy.

At operation 403, the roll-out policy is $G_\beta$ is initialized with the generator policy $G_\theta$.

At operation 404, the contextual-naturalness-estimator Do is trained using negative examples generated from $G_\theta$.

The method then repeats operations 405-415 until the method converges to a predetermined threshold level.

Further, operations 406-412 are performed for n cycles. Thus, n is a counter that determines how often the generator is updated and the value of n is tunable. Within each cycle, operations 407-412 are performed for each b in the batch B.

At operation 408, K sequences are generated using the using configured sampling-strategy $y_{1:T}^{b,1:K} = (y_1^{b,1:K}, y_2^{b,1:K}, \ldots, y_T^{b,1:K}) \sim G_\beta$.

Further, at operation 409, the future reward is calculated for each generated sequence using equation (2).

At operation 410, the MC gradient is calculated using equation (3). The MC gradient indicates how much to update the weights of the model at each cycle.

At operation 411, the parameters of $G_\theta$ are upgraded using equation (4) based on the MC gradient. This means that while one generator Go is being updated, the other generator $G_\beta$ is generating the samples, and after some n steps, the generator creating the samples is updated with the current value of $G_\theta$ (operation 414).

Operation 412 is for checking the end of the cycle from operation 407. Operation 413 is for checking the end of the cycle from operation 406.

At operation 414, the roll-out policy $G_\beta$ is updated with the current value of the generator policy $G_\theta$.

Operation 415 is for checking the end of the cycle from operation 405 when the data converges, e.g., the loss function that is gradually reduced reaches an acceptable level.

Figure 5:
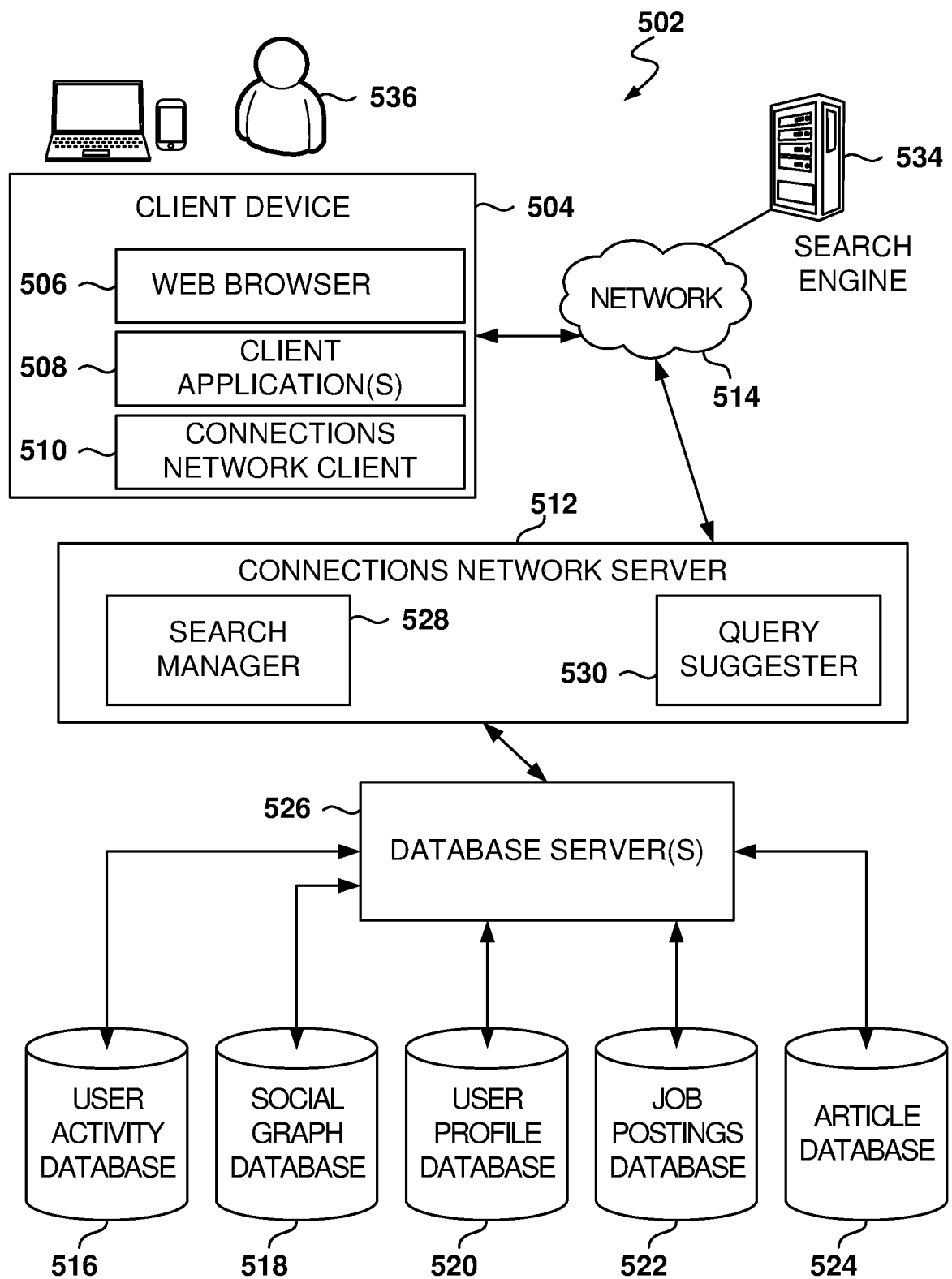
FIG. 5 is a block diagram illustrating a networked system, according to some example embodiments, including a connections network server, illustrating an example embodiment of a high-level client-server-based network architecture.

FIG. 5 is a block diagram illustrating a networked system, according to some example embodiments, including a connections network server 512, illustrating an example embodiment of a high-level client-server-based network architecture 502. Embodiments are presented with reference to an online service, and, in some example embodiments, the online service is a social networking service or a connections network.

The connections network server 512 provides server-side functionality via a network 514 (e.g., the Internet or a wide area network (WAN)) to one or more client devices 504. FIG. 5 illustrates, for example, a web browser 506, client application(s) 508, and a connections network client 510 executing on a client device 504. The connections network server 512 is further communicatively coupled with one or more database servers 526 that provide access to one or more databases 516-524.

The connections network server 512 includes, among other modules, a search manager 528 and a query suggester 530. The search manager 528 performs search operations in the connections network service and includes modules for different types of searches. The query suggester 530 generates search-query suggestions for the user, such as in the example illustrated in FIG. 1.

The client device 504 may comprise, but is not limited to, a mobile phone, a desktop computer, a laptop, a tablet, a netbook, a multi-processor system, a microprocessor-based or programmable consumer electronic system, or any other communication device that a user 536 may utilize to access the connections network server 512. In some embodiments, the client device 504 may comprise a display module (not shown) to display information (e.g., in the form of user interfaces).

In one embodiment, the connections network server 512 is a network-based appliance that responds to initialization requests or search queries from the client device 504. One or more users 536 may be a person, a machine, or other means of interacting with the client device 504. In various embodiments, the user 536 interacts with the network architecture 502 via the client device 504 or another means.

The client device 504 may include one or more applications (also referred to as "apps") such as, but not limited to, the web browser 506, the connections network client 510, and other client applications 508, such as a messaging application, an electronic mail (email) application, a news application, and the like. In some embodiments, if the connections network client 510 is present in the client device 504, then the connections network client 510 is configured to locally provide the user interface for the application and to communicate with the connections network server 512, on an as-needed basis, for data and/or processing capabilities not locally available (e.g., to access a user profile, to authenticate a user 536, to identify or locate other connected users 536, etc.). Conversely, if the connections network client 510 is not included in the client device 504, the client device 504 may use the web browser 506 to access the connections network server 512.

In addition to the client device 504, the connections network server 512 communicates with the one or more database servers 526 and databases 516-524. In one example embodiment, the connections network server 512 is communicatively coupled to a user activity database 516, a social graph database 518, a user profile database 520, a job postings database 522, and an article database 524. The databases 516-524 may be implemented as one or more types of databases including, but not limited to, a hierarchical database, a relational database, an object-oriented database, one or more flat files, or combinations thereof.

The user profile database 520 stores user profile information about users 536 who have registered with the connections network server 512. With regard to the user profile database 520, the user 536 may be an individual person or an organization, such as a company, a corporation, a non-profit organization, an educational institution, or other such organizations.

In some example embodiments, when a user 536 initially registers to become a user 536 of the connections network service provided by the connections network server 512, the user 536 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 520. Similarly, when a representative of an organization initially registers the organization with the connections network service provided by the connections network server 512, the representative may be prompted to provide certain information about the organization, such as a company industry.

As users 536 interact with the connections network service provided by the connections network server 512, the connections network server 512 is configured to monitor these interactions. Examples of interactions include, but are not limited to, commenting on posts entered by other users 536, viewing user profiles, editing or viewing a user 536's own profile, sharing content outside of the connections network service (e.g., an article provided by an entity other than the connections network server 512), updating a current status, posting content for other users 536 to view and comment on, posting job suggestions for the users 536, searching job postings, and other such interactions. In one embodiment, records of these interactions are stored in the user activity database 516, which associates interactions made by a user 536 with his or her user profile stored in the user profile database 520.

The job postings database 522 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 526 are illustrated as a single block, one of ordinary skill in the art will recognize that the database server(s) 526 may include one or more such servers. Accordingly, and in one embodiment, the database server(s) 526 implemented by the connections network service are further configured to communicate with the connections network server 512.

The network architecture 502 may also include a search engine 534. Although only one search engine 534 is depicted, the network architecture 502 may include multiple search engines 534. Thus, the connections network server 512 may retrieve search results (and, potentially, other data) from multiple search engines 534. The search engine 534 may be a third-party search engine.

Figure 6:
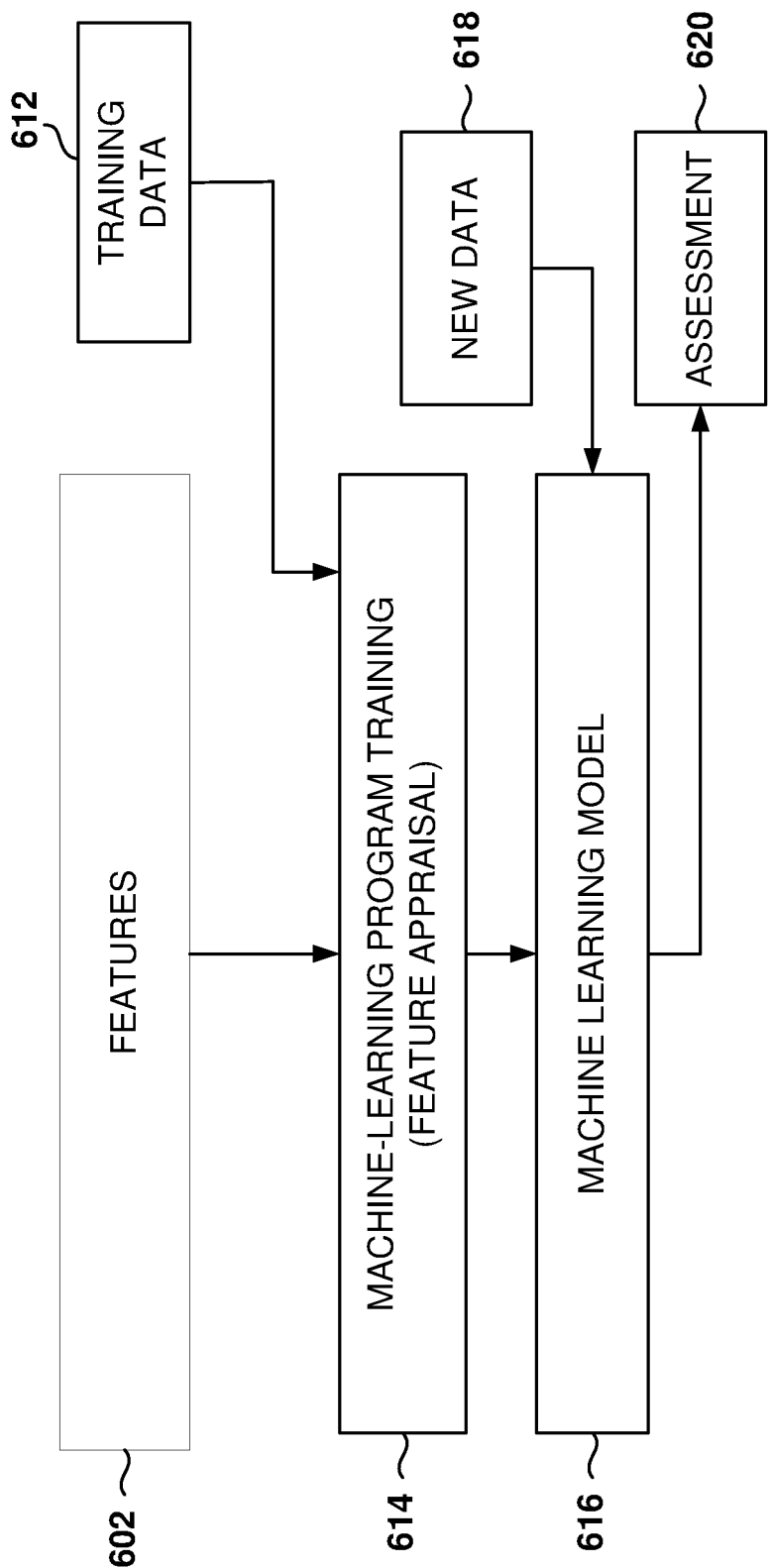
FIG. 6 illustrates the training and use of a machine-learning model, according to some example embodiments.

FIG. 6 illustrates the training and use of a machine-learning model, according to some example embodiments. In some example embodiments, machine-learning (ML)

models 616, are utilized to perform operations associated with searches, such as suggesting search queries.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 616 from example training data 612 in order to make data-driven predictions or decisions expressed as outputs or assessments 620. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data. In some embodiments, example ML model 616 provides a search-query suggestion.

The training data 612 comprises examples of values for the features 602. In some example embodiments, the training data comprises labeled data with examples of values for the features and labels indicating the outcome, such as queries previously entered by users, positive interactions with results, session length, etc. The machine-learning algorithms utilize the training data 612 to find correlations among identified features 602 that affect the outcome. A feature 602 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 602 may be of different types and may include one or more of user profile information, queries entered by users, responses of users to query results, length of user session, outcome of the session (positive or negative), etc.

During training 614, the ML program, also referred to as ML algorithm or ML tool, analyzes the training data 612 based on identified features 602 and configuration parameters defined for the training. The result of the training 614 is the ML model 616 that is capable of taking inputs to produce assessments.

Training an ML algorithm involves analyzing large amounts of data (e.g., from several gigabytes to a terabyte or more) in order to find data correlations. The ML algorithms utilize the training data 612 to find correlations among the identified features 602 that affect the outcome or assessment 620.

The ML algorithms usually explore many possible functions and parameters before finding what the ML algorithms identify to be the best correlations within the data; therefore, training may make use of large amounts of computing resources and time.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a time-consuming task that makes use of a large amount of computer resources.

When the ML model 616 is used to perform an assessment, new data 618 is provided as an input to the ML model 616, and the ML model 616 generates the assessment 620 as output. For example, when a search query is entered by the user, related search queries are presented to the user. In other embodiments, query suggestions may also be presented in response to user interactions with the online service.

Figure 7:
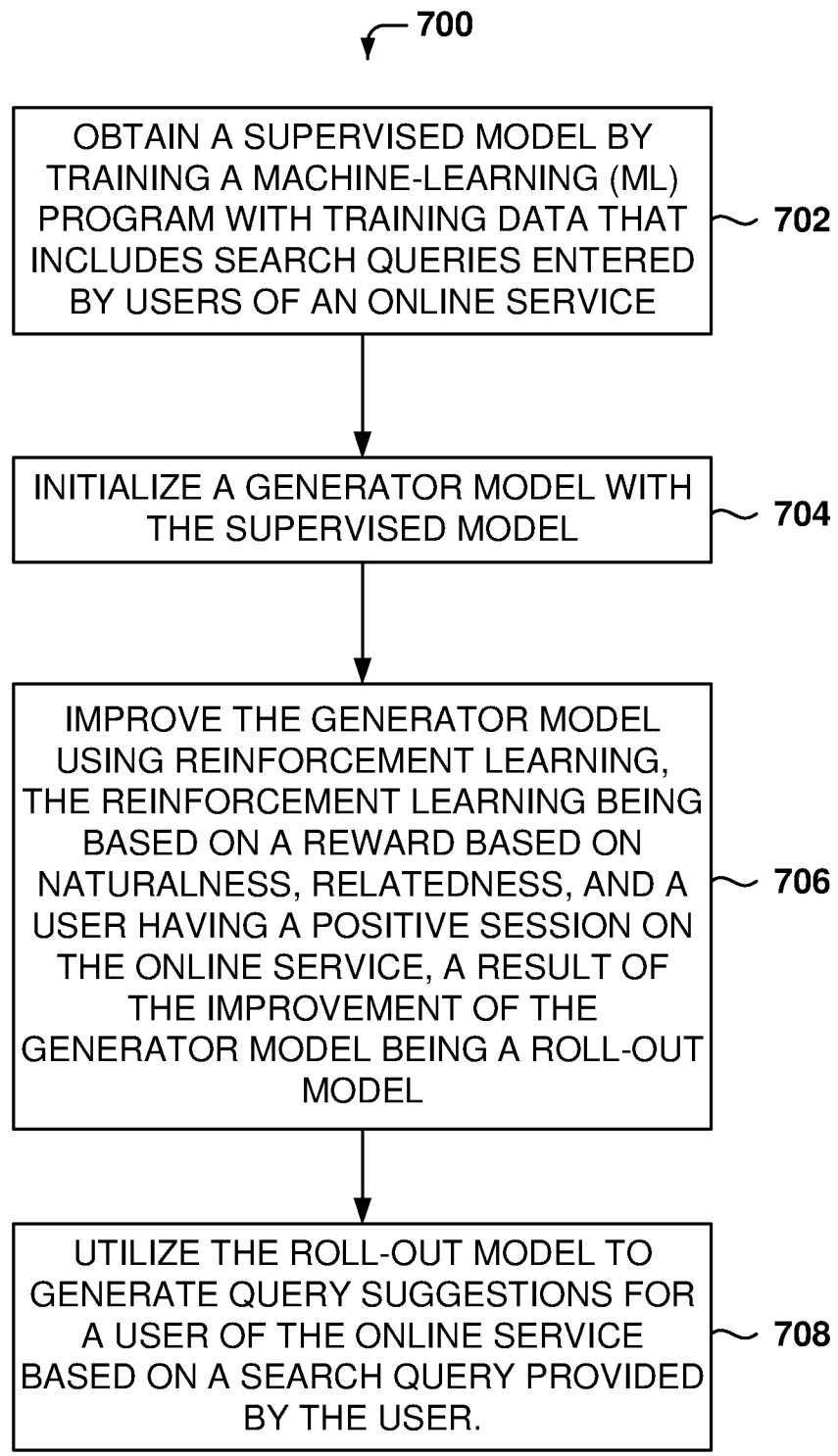
FIG. 7 is flowchart of a method for suggesting related search queries, according to some example embodiments.

FIG. 7 is flowchart of a method 700 for suggesting related search queries, according to some example embodiments. While the various operations in this flowchart are presented and described sequentially, one of ordinary skill will appreciate that some or all of the operations may be executed in a different order, be combined or omitted, or be executed in parallel.

Operation 702 is for obtaining a supervised model by training a machine-learning (ML) program with training data that includes search queries entered by users of an online service.

From operation 702, the method 700 flows to operation 704 to initialize a generator model with the supervised model.

From operation 704, the method 700 flows to operation 706 where the generator model is improved using reinforcement learning. The reinforcement learning is based on a reward based on naturalness, relatedness, and a user having a positive session on the online service. Further, the result of the improvement of the generator model is a roll-out model.

From operation 706, the method 700 flows to operation 708 where the roll-out model is utilized to generate query suggestions for a user of the online service based on a search query provided by the user.

In one example, the reward has a predetermined value when the user has the positive session on the online service.

In one example, the reward is based on the naturalness and relatedness when the user does not have the positive session on the online service.

In one example, a component of the reward for naturalness is calculated using a contextual-naturalness-estimator trained using negative examples generated with the generator model.

In one example, the negative examples include one or more of a negative sample query from the supervised model, duplicating a word at random in a query suggestion, replacing a word in the query with an unknown word token, and repeating a sampled word from a categorical distribution.

In one example, a component of the reward for relatedness is based on syntactic similarity between a generated query and a source query.

In one example, the reward further includes a factor based on offensiveness of the query suggestion.

In one example, improving the generator model further comprises, for a plurality of predetermined number of cycles: analyzing a batch of sequences; and updating a generator policy based on the analysis of each batch.

In one example, analyzing each batch further comprises generating sequences using a sampling strategy, computing the reward for each sequence, and computing an expected value of the reward for all the generated sequences.

In one example, the supervised model is an encoder-decoder Seq2Seq attention model.

Another general aspect is for a system that includes a memory comprising instructions and one or more computer processors. The instructions, when executed by the one or more computer processors, cause the one or more computer processors to perform operations comprising: obtaining a supervised model by training a machine-learning (ML) program with training data that includes search queries entered by users of an online service; initializing a generator model with the supervised model; improving the generator model using reinforcement learning, the reinforcement learning being based on a reward based on naturalness, relatedness, and a user having a positive session on the online service, a result of the improvement of the generator model being a roll-out model; and utilizing the roll-out model to generate query suggestions for a user of the online service based on a search query provided by the user.

In yet another general aspect, a machine-readable storage medium (e.g., a non-transitory storage medium) includes instructions that, when executed by a machine, cause the machine to perform operations comprising: obtaining a supervised model by training a machine-learning (ML) program with training data that includes search queries entered by users of an online service; initializing a generator model with the supervised model; improving the generator model using reinforcement learning, the reinforcement learning being based on a reward based on naturalness, relatedness, and a user having a positive session on the online service, a result of the improvement of the generator model being a roll-out model; and utilizing the roll-out model to generate query suggestions for a user of the online service based on a search query provided by the user.

Experiments conducted, to compare the performance of the new method for query suggestions to other existed methods, showed positive results. User search-query logs were randomly sampled and divided into a training set, a validation set, and a test set. The selected maximum length for a query was 8 words and the mean length was about 2 words.

During inference, six queries were generated per input query using beam-search decoding. Negative examples to train the two-layered BiLSTM contextual-naturalness-estimator are obtained from the pre-trained Seq2SeqNMT model. At inference, the naturalness probability Do was obtained from the output of fully-connected layer with last time-step's hidden state as its input.

Regarding evaluation metrics, the binary "natural/unnatural" class prediction performance of the contextual naturalness estimator was evaluated using F1 score and Accuracy metrics. The mean of the following metrics calculated on the test set, to evaluate the relevance, engagement, accuracy and heterogeneity of generated queries, were used:

Sessions with positive user-action (Sessions+@6): Long-term binary engagement metric indicating if recommended queries lead to a successful session. Its value is "1", if any of the six generated queries belong to a search-session in test-data with an associated down-stream positive user action.

Unique@6: heterogeneity metric indicating the percentage of unique sentences in (six) query suggestions made per query. Queries containing unknown word token ("<UNK>") are filtered out as only high-quality suggestions are presented to the end user.

Precision@6: measures relevance with respect to the query a user would enter next. It has a value of 1 if $(q_{i+1}^{test})$ is in the set of six query suggestions made for $q_i^{test}$ and 0 otherwise.

Word-repetitions per sentence (Repetitionss): fraction of word repetitions per generated query (S). Unwanted word repetitions lead to lower quality.

Prior Sentence Probability ($P_S$): $P_S = \Sigma_{w_i \in S} \log (p_{w_i})$ measures the prior sentence probability. $p_{w_i}$ is the prior word probability. Lower sentence probability indicates higher heterogeneity as generated queries contain less frequent words.

The results showed that the contextual-naturalness-estimator achieved high accuracy and high F1 performance on the test set. Over the baseline supervised model, our proposed approach achieves a significant relative improvement in terms of recommendation heterogeneity, down-stream user-engagement, and per-sentence word repetitions.

On offline test data set, in comparison to the baseline Seq2SeqNMT model, Seq2Seq—NMT removed query suggestions with repeated words completely, however the heuristics-based model performed poorly in-terms of heterogeneity (4.5% relative drop in mean Unique@6) and average number of successful sessions. On the other hand, both versions of the proposed DRL models outperformed the baseline model on all metrics. DRL variants achieved significant relative improvement in-terms of user-engagement, query suggestions' heterogeneity, sentence-level heterogeneity, and reduction in errors per sentence. Non-significant improvement in relevance (mean Precision@6) was not surprising as the supervised Seq2SeqNMT model is also trained with consecutive query pairs.

In summary, solving this multi-objective problem is complex. The related search suggestion problem is not straightforward, because identifying relatedness is complex. The current approach bootstraps the method by starting with the supervised model and then iteratively fine tuning the model with reinforcement learning. Starting without the supervised model would mean that sampling starts without prior information (e.g., random word selections) and the model would take much longer to converge. Instead, we take the supervised model is used at the beginning and convergence is monitored, and a reward signal is designed to achieve the desired objectives.

In comparison to supervised modeling techniques, the presented methods improve quality of generated text, especially when labels for training supervised models are noisy. This addresses the label sparsity problem. Further, the exposure bias is overcome, which supervised models are susceptible to.

Additionally, automated reward estimation methods scale the RL model training. An automated naturalness estimator is introduced to evaluate the "realness" of a generated query. Further, it was proven that hard negative examples to train the supervised reward estimator could be obtained from a pre-trained supervised model. Further yet, the convergence of the policy gradient was also improved.

Figure 8:
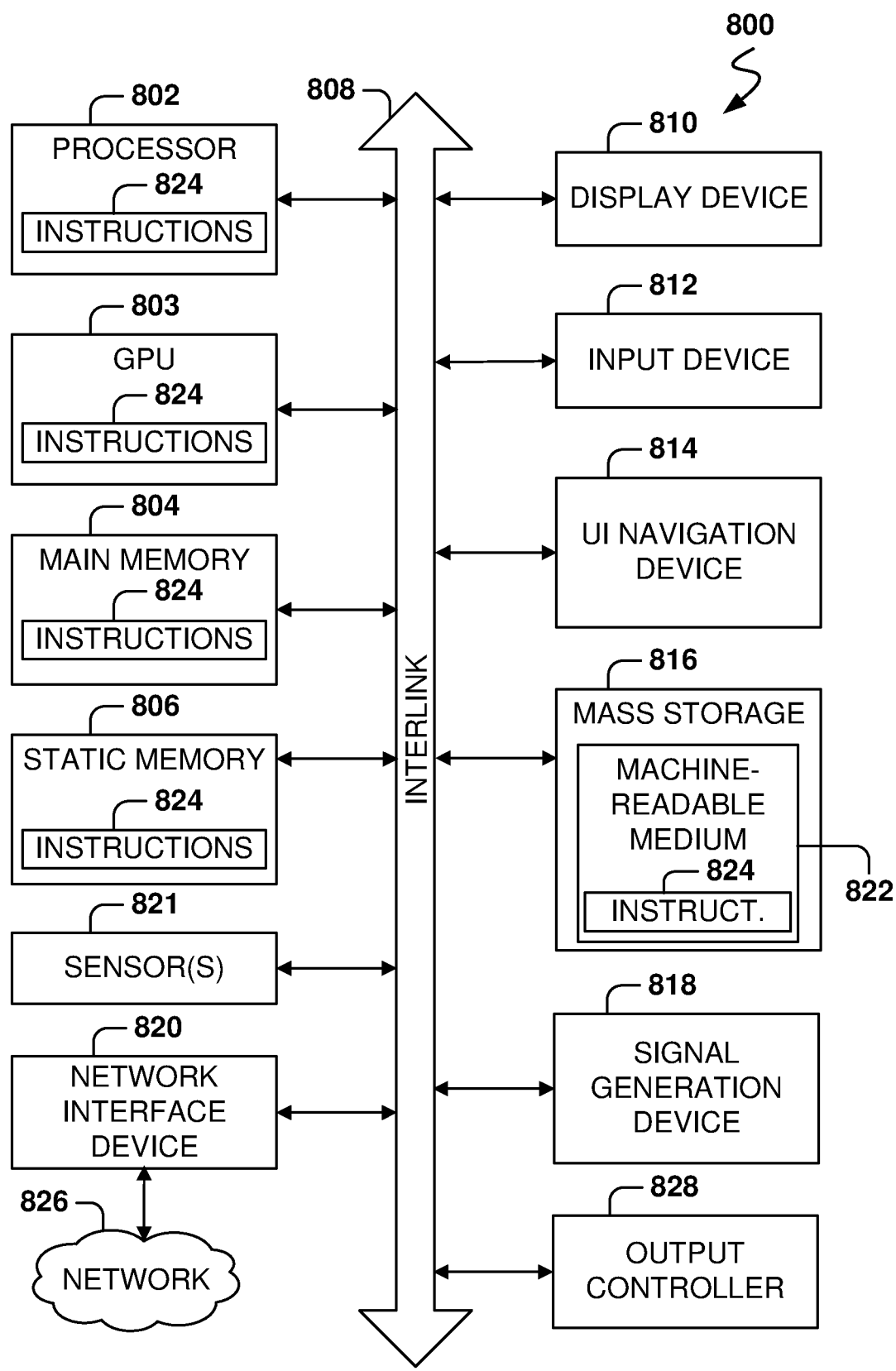
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
obtaining a weakly supervised model by training a machine-learning (ML) program with training data that includes search queries entered by users of an online service, the weakly supervised model trained using co-occurring consecutive query pairs in search sessions, wherein the co-occurring consecutive query pairs define, for a search session having a sequence of N queries, N−1 consecutive query pairs, wherein at least one consecutive query pair of the N−1 consecutive query pairs is semantically unrelated;
initializing a generator model with the weakly supervised model;
improving the generator model using reinforcement learning, the reinforcement learning being based on a reward based on naturalness, relatedness, and a user having a positive session on the online service, a result of the improvement of the generator model being a roll-out model; and
utilizing the roll-out model to generate query suggestions for a user of the online service based on a search query provided by the user.

2. The method as recited in claim 1, wherein the reward has a predetermined value when the user has the positive session on the online service.

3. The method as recited in claim 1, wherein the reward is based on the naturalness and relatedness when the user does not have the positive session on the online service.

4. The method as recited in claim 3, wherein a component of the reward for naturalness is calculated using a contextual-naturalness-estimator trained using negative examples generated with the generator model.

5. The method as recited in claim 4, wherein the negative examples include one or more of a negative sample query from the supervised model, duplicating a word at random in a query suggestion, replacing a word in the search query with an unknown word token, and repeating a sampled word from a categorical distribution.

6. The method as recited in claim 3, wherein a component of the reward for relatedness is based on syntactic similarity between a generated query and a source query.

7. The method as recited in claim 1, wherein the reward further includes a factor based on offensiveness of the query suggestion.

8. The method as recited in claim 1, wherein improving the generator model further comprises:
for a plurality of predetermined number of cycles:
analyzing a batch of sequences; and
updating a generator policy based on the analysis of each batch.

9. The method as recited in claim 8, wherein analyzing each batch further comprises:
generating sequences using a sampling strategy;
computing the reward for each sequence; and
computing an expected value of the reward for the generated sequences.

10. The method as recited in claim 1, wherein the supervised model is an encoder-decoder Seq2Seq attention model.

11. A system comprising:
a memory comprising instructions; and
one or more computer processors, wherein the instructions, when executed by the one or more computer processors, cause the system to perform operations comprising:
obtaining a weakly supervised model by training a machine-learning (ML) program with training data that includes search queries entered by users of an online service, the weakly supervised model trained using co-occurring consecutive query pairs in search sessions, wherein the co-occurring consecutive query pairs define, for a search session having a sequence of N queries, N−1 consecutive query pairs, wherein at least one consecutive query pair of the N−1 consecutive query pairs is semantically unrelated;
initializing a generator model with the weakly supervised model;
improving the generator model using reinforcement learning, the reinforcement learning being based on a reward based on naturalness, relatedness, and a user having a positive session on the online service, a result of the improvement of the generator model being a roll-out model; and
utilizing the roll-out model to generate query suggestions for a user of the online service based on a search query provided by the user.

12. The system as recited in claim 11, wherein the reward has a predetermined value when the user has the positive session on the online service, wherein the reward is based on the naturalness and relatedness when the user does not have the positive session on the online service.

13. The system as recited in claim 12, wherein a component of the reward for naturalness is calculated using a contextual-naturalness-estimator trained using negative examples generated with the generator model, wherein the negative examples include one or more of a negative sample query from the supervised model, duplicating a word at random in a query suggestion, replacing a word in the search query with an unknown word token, and repeating a sampled word from a categorical distribution.

14. The system as recited in claim 12, wherein a component of the reward for relatedness is based on syntactic similarity between a generated query and a source query.

15. The system as recited in claim 11, wherein improving the generator model further comprises:
for a plurality of predetermined number of cycles:
analyzing a batch of sequences, wherein analyzing each batch further comprises:
generating sequences using a sampling strategy;
computing the reward for each sequence; and
computing an expected value of the reward for the generated sequences; and
updating a generator policy based on the analysis of each batch.

16. A tangible machine-readable non-transitory storage medium including instructions that, when executed by a machine, cause the machine to perform operations comprising:

- obtaining a weakly supervised model by training a machine-learning (ML) program with training data that includes search queries entered by users of an online service, the weakly supervised model trained using co-occurring consecutive query pairs in search sessions, wherein the co-occurring consecutive query pairs define, for a search session having a sequence of N queries, N-1 consecutive query pairs, wherein at least one consecutive query pair of the N-1 consecutive query pairs is semantically unrelated;
- initializing a generator model with the weakly supervised model;
- improving the generator model using reinforcement learning, the reinforcement learning being based on a reward based on naturalness, relatedness, and a user having a positive session on the online service, a result of the improvement of the generator model being a roll-out model; and
- utilizing the roll-out model to generate query suggestions for a user of the online service based on a search query provided by the user.

17. The tangible machine-readable storage medium as recited in claim 16, wherein the reward has a predetermined value when the user has the positive session on the online service, wherein the reward is based on the naturalness and relatedness when the user does not have the positive session on the online service.

18. The tangible machine-readable storage medium as recited in claim 17, wherein a component of the reward for naturalness is calculated using a contextual-naturalness-estimator trained using negative examples generated with the generator model, wherein the negative examples include one or more of a negative sample query from the supervised model, duplicating a word at random in a query suggestion, replacing a word in the search query with an unknown word token, and repeating a sampled word from a categorical distribution.

19. The tangible machine-readable storage medium as recited in claim 17, wherein a component of the reward for relatedness is based on syntactic similarity between a generated query and a source query.

20. The tangible machine-readable storage medium as recited in claim 16, wherein improving the generator model further comprises:

for a plurality of predetermined number of cycles:
- analyzing a batch of sequences, wherein analyzing each batch further comprises:
  - generating sequences using a sampling strategy;
  - computing the reward for each sequence; and
  - computing an expected value of the reward for the generated sequences; and
- updating a generator policy based on the analysis of each batch.

* * * * *